United States Patent [19]

LeBlanc

[11] 4,278,174
[45] Jul. 14, 1981

[54] DISPLAY AND STORAGE ASSEMBLY

[76] Inventor: Paul L. LeBlanc, 24 Kendra St., Apt. 6, Moncton, New Brunswick, Canada, E1C 4J8

[21] Appl. No.: 73,808

[22] Filed: Sep. 10, 1979

[30] Foreign Application Priority Data

Apr. 20, 1979 [CA] Canada .................................. 326007

[51] Int. Cl.³ .............................................. A47F 7/00
[52] U.S. Cl. ..................................... 211/40; 108/101; 211/194; 312/111
[58] Field of Search .................. 211/40, 194, 43, 184; 108/101, 111, 114, 61; 312/107, 111

[56] References Cited

U.S. PATENT DOCUMENTS

| | | | |
|---|---|---|---|
| 1,237,101 | 8/1917 | Ryan | 211/43 |
| 3,318,454 | 5/1967 | Donlin | 211/43 |
| 4,175,807 | 11/1979 | Kranich et al. | 211/194 |

FOREIGN PATENT DOCUMENTS 2039696  2/1972  Fed. Rep. of Germany ........... 312/111

*Primary Examiner*—Roy D. Frazier
*Assistant Examiner*—Robert W. Gibson, Jr.
*Attorney, Agent, or Firm*—Balogh, Osann, Kramer, Dvorak, Genova & Traub

[57] ABSTRACT

A display and storage assembly primarily intended for storing and displaying sound cassettes and eight-track tapes is disclosed. The assembly has an elongate base section and at least one upright partition member is mounted on the base section for sliding movement therealong. One end of the base section has a transverse male dove-tail configuration, and the other end of the base section has a female dove-tail configuration whereby identical base members may be joined endwise together to any length. Complementary end caps to cover the ends of the base sections are also provided. The top surface of each upright member has a recess and the bottom surface of each base member has a number of transverse downward projections provided uniformly therealong, with the recess being adapted to receive a selected one of the downward projections enabling vertical enlargement of the assembly. The top surface of the base sections have low transverse dividers to separate and support cassettes carried therebetween.

3 Claims, 10 Drawing Figures

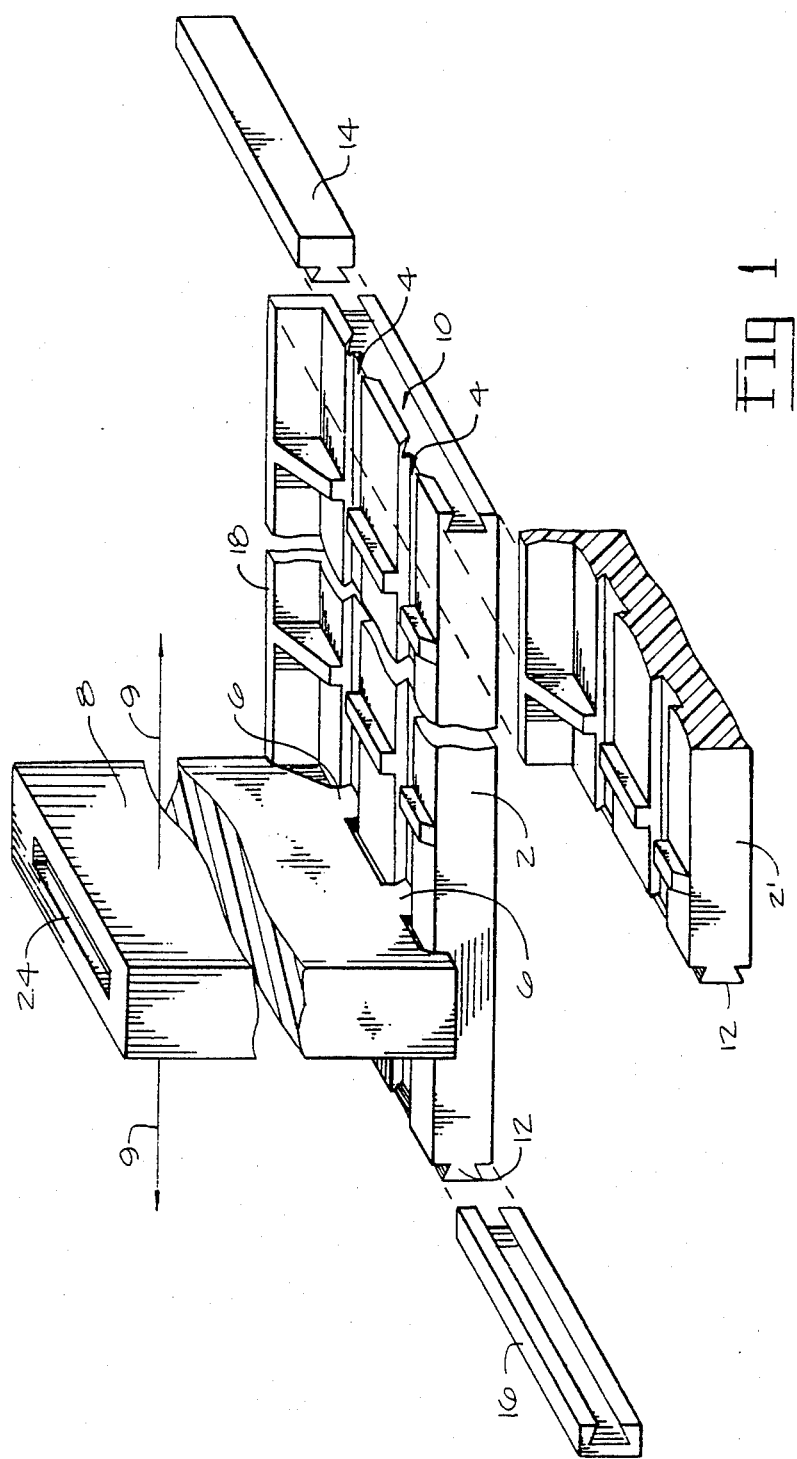

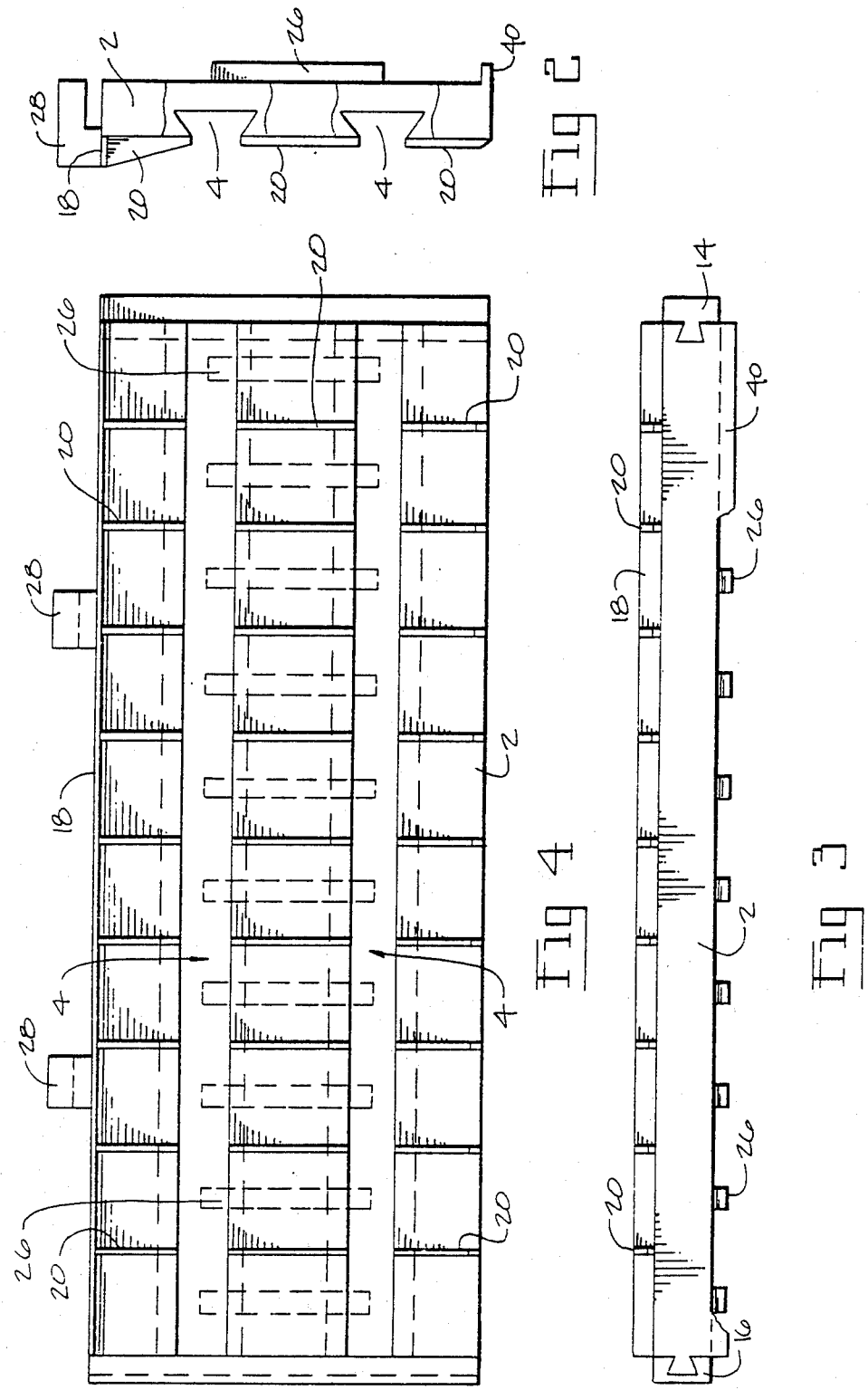

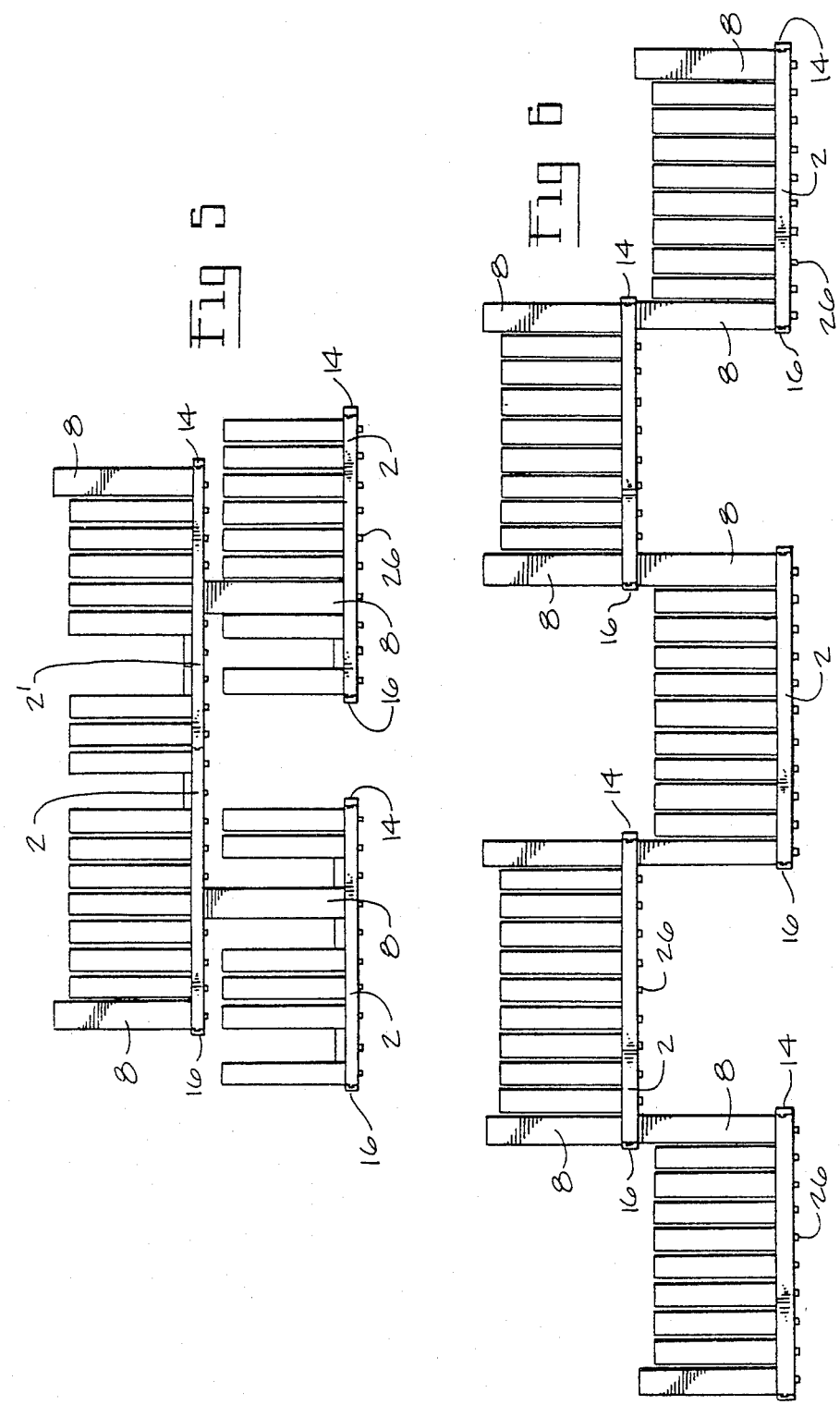

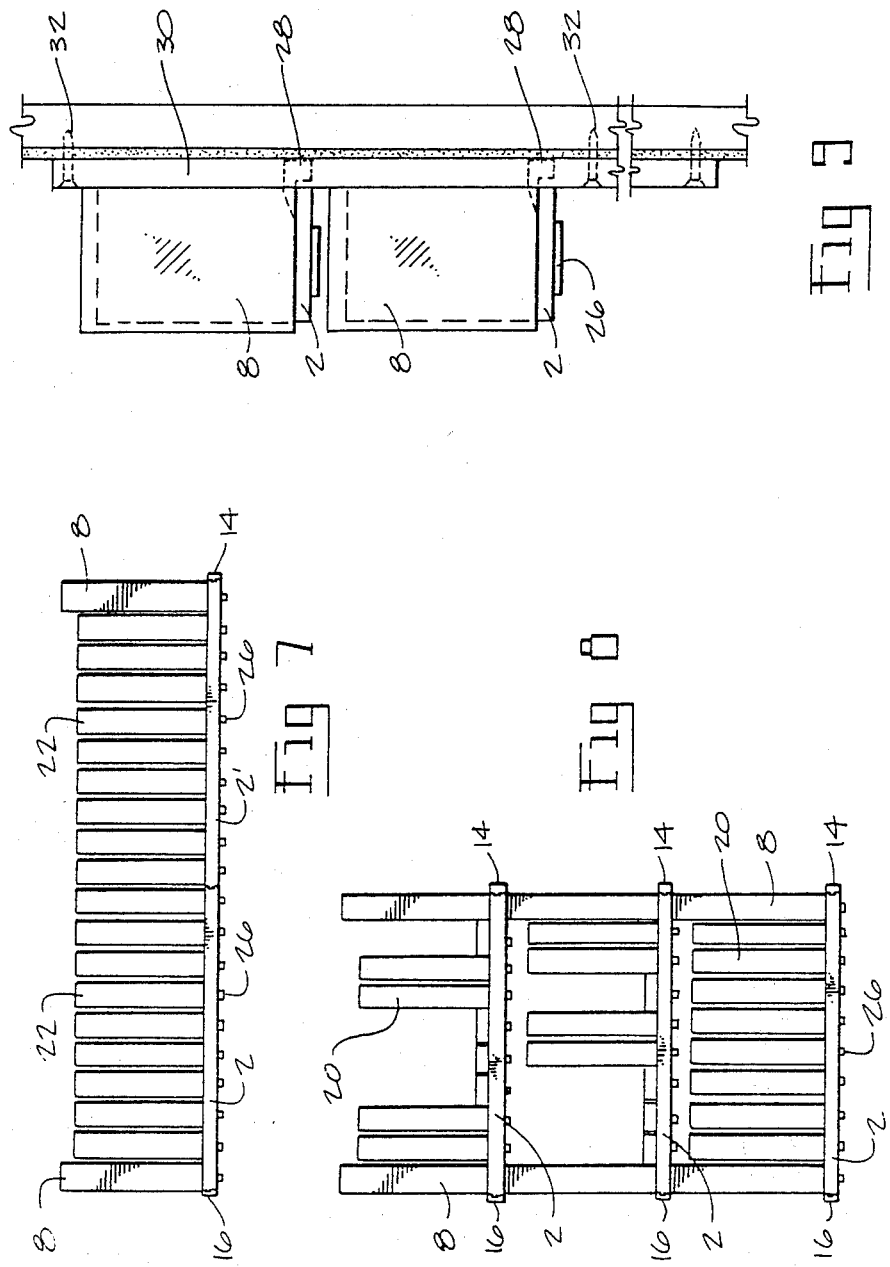

DISPLAY AND STORAGE ASSEMBLY

The present invention relates to a display and storage assembly, and while the assembly is primarily for storing and displaying sound cassettes and eight-track tapes, the assembly may also be used for the storage and display of other items such as books and the like.

The invention is directed toward a storage and display assembly which is versatile in use, enabling the build-up of similar assemblies both in vertical and horizontal directions to accommodate increasing numbers of articles such as cassettes and tapes, and which is designed to provide a free-standing assembly which can be enlarged and extended in both vertical and horizontal directions in any number of esthetic patterns, and which also is adapted for wall mounting or for carrying in a suitable container such as an attache case, and the like, which has been suitably modified.

DESCRIPTION OF PRIOR ART

U.S. Pat. No. 3,856,369 granted Dec. 24, 1974, to Michel Commiant relates to a Cassette Holder Assembly which consists of individual partially positioned box components which can be assembled together in vertical and horizontal fashion to provide a storage assembly which can be increased in size as desired. The assembly of this Patent, however, requires that all added components be placed in flush contact with previous components to provide stability, and the assembly cannot be enlarged in any number of esthetic patterns to provide for versatility in assembly and use.

Similar comments apply to the assembly shown in Canadian Pat. No. 864,398, issued Feb. 23, 1971, to Donald Shewchuk, and entitled "Stackable and Interlocking Containers".

OBJECTS OF THE PRESENT INVENTION

The present invention constitutes an improvement over the teachings of the prior art by providing a storage and display assembly which is extremely versatile in assembly and in use, and which enables esthetic assembly in any number of ways to provide for enhanced appearance, and which assembly also enables wall-mounting and mounting within a carrying case as desired.

The prime object of the present invention is to provide a storage and display assembly primarily intended for sound cassettes and eight-track tapes, and which is versatile in assembly and use, and which is economical in manufacture, and which can be enlarged in either vertical or horizontal directions by the addition of similar complementary components as desired to receive increasing numbers of items to be stored.

More specifically, the object of the present invention is to provide a storage and display assembly primarily adapted for receiving cassettes and eight-track tapes, and comprising an elongate base section having at least one upwardly opening longitudinal groove of female dovetail configuration, and at least one upright partition member having at least one downward projection of male dovetail configuration for sliding engagement within the at least one longitudinal groove, one end of the base section having a transverse male dovetail configuration and the other end of the base section having a female dovetail configuration whereby identical base members may be joined endwise together to any lengths, and complementary end caps to cover the end of the base section, the top surface of each upright member having a recess therein, and the bottom surface of each base member having a number of transverse downward projections provided uniformly therealong, the recess being adapted to receive a selected one of the downward projections enabling vertical enlargement of the assembly, the top surface of the base sections having low transverse dividers to separate and support cassettes carried therebetween.

BRIEF DESCRIPTION OF DRAWINGS

The inventive concept will now be more fully described with reference to the accompanying drawings wherein:

FIG. 1 illustrates in perspective view a portion of a basic modular assembly;

FIG. 2 illustrates in end view a modular base section as shown in FIG. 1;

FIG. 3 illustrates in front view the modular base assembly as shown in FIG. 1;

FIG. 4 illustrates the modular base section of FIG. 1 in top view;

FIGS. 5, 6, 7, and 8, illustrate examples of structural variations which can be formed according to the present invention;

FIG. 9 illustrates in side view the mounting of the structural assembly on a wall.

DETAILED DESCRIPTION OF PREFERRED EMBODIMENT

Figure 10:
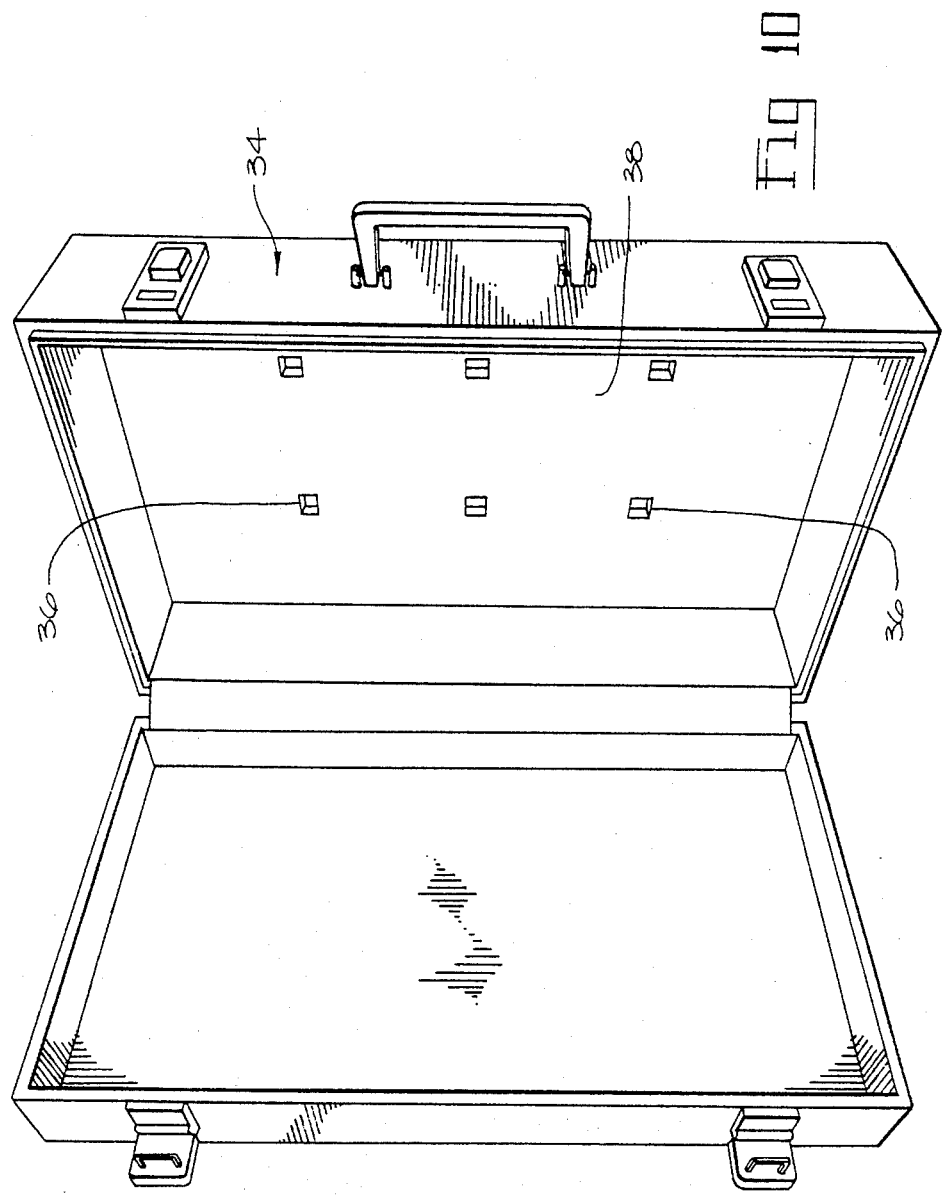
FIG. 10 illustrates a carrying case having openings provided therein for the reception of the modular assembly according to the present invention.

Reference will now be had to the accompanying drawings in more specific detail and wherein like numerals refer to like parts. Some sectional views in the drawings show the assembly as being made of plastic material, and it will be appreciated that other suitable materials such as wood or metal could be used as desired.

A modular base section is shown in FIG. 1, by numeral 2, and end, front and top views of this base section are shown in FIGS. 2, 3 and 4, respectively.

The modular base section 2 is provided with two longitudinal upwardly opening grooves 4 which are adapted to slidingly receive downward projections 6 provided on upright member 8. In preferred construction, the upwardly opening grooves 4 are of female dovetailed configuration, and the downward projections 6 are of male dovetail configuration. The upright member 8 is slidably movable (see arrows 9) along the length of the modular base section 2 to any desired position. While two upwardly opening grooves 4 and two downwardly extending projections 6 are shown in the drawings, it will be appreciated that a single groove and a single projection (or any other number) could be employed without departing from the scope of the present invention; the arrangement used enabling selected positioning of the upright member with respect to the modular base section. In one embodiment, the present invention consists of one modular base section 2, and two upright members 8. This basic arrangement is shown in FIGS. 6, and 8, and constitutes the upper tier of the assemblies illustrated.

One or both ends of the modular base section 2 are designed to permit longitudinal extensions of the modular base to provide a double-length base such as shown in FIGS. 5 and 7. With respect to FIG. 1, the right-hand end of the modular base section is provided with a transverse female dovetail joint 10, whereas the left-hand end of the modular base section shown in FIG. 1 is provided with a male dovetail joint 12, and it will be appreciated that identical modular base sections can be added to extend the length of the base to any desired length. FIG. 1 illustrates a second modular base section shown as 2' in position for mating with base section 2 to provide a double-length base as illustrated in FIGS. 5 and 7.

To provide for more attractive appearance, complementary end caps are provided to cover the dovetail configurations at the end of each modular base sections, and these end caps are shown by numerals 14 and 16 in FIG. 1. It will be appreciated that if two modular base sections are fitted together to provide a base having a double length, that the end caps will be used on each end of the double length to provide a finished appearance to the structure as fully shown in FIGS. 5 and 7.

The rear of each modular base section is provided with a low upstanding wall 18 and low transverse dividers 20 are provided across the top of each base section and these act as low partitions between individual cassettes or tapes 22 carried thereby. The dividers 20 are higher at their rearmost portions and the tops of the dividers extend from the rear wall forwardly first in a downwardly and then in a horizontal arrangement to provide for division and support of the cassette or tapes 22 carried therebetween. Eight-track tapes are somewhat greater in size than cassettes and the distance between dividers 20 may be varied during manufacture, depending upon the type of cartridge which is to be stored.

The downward projections 6 carried by the upright members 8 are of a length to enable sliding movement of the upright members with respect to the modular base section without interference with the dividers 20.

The top surface of each of the upright members is provided with a rectangular recess 24; and the bottom surface of each base section 8 is as shown in FIG. 3 provided with transverse downwardly extending rectangular projections 26, each of which projections 26 are of a size to be snugly received within the recess 24 provided in the top of each upright member. It will thus be appreciated that a base section carrying two upright members 8 can receive an upper identical section in any desired arrangement such as shown in any of the embodiments of FIGS. 5 through 8, by the selective positioning of the upright members 8 with respect to the downwardly extending projections 26.

FIG. 7 illustrates two base sections 2 and 2' joined end to end and having two upright members 8. FIG. 5 shows the assembly of FIG. 7 supported by two individual lower units, and FIG. 8 shows a build-up of modular sections in vertical relationship, and FIG. 6 shows a still further arrangement which can be provided by the modular concept of the present invention.

As shown in FIG. 4, the rear of each modular base section 2 is provided with hook-members 28 which can be used to support the modular assembly from wall channel members in a manner as shown in FIG. 9. FIG. 9 shows a wall mounting channel 30, secured to a wall by suitable screws 32; the wall mounting channels 30 being provided with openings (not specifically shown) to receive the hook members 22 to support the modular assembly. The size of the hook-members 28 and the size of the channel members will of course be such that the modular assemblies will be snugly held in position preventing any rocking or tilting.

The same hook-members 28 can be used to support a modular assembly within a carrying case 34 such as shown in FIG. 10. In FIG. 10, six hook-receiving apertures 36 are provided in a panel 38 positioned in the carrying case and spaced from the back panel thereof, and the modular arrangements are positioned in the carrying case using the hook members much in the same way as the units are wall mounted as shown in FIG. 9.

FIGS. 2 and 3 show the provision of a small apron 40 extending downwardly a short distance from the front edge of the base section 2. For purposes of better understanding, this apron 40 is not shown in the remaining Figures, and the purpose of the apron is simply to hide the projections 26 in frontal view.

In the drawings the upright partitions 8 are shown as being generally in block form. It will be appreciated, however, that the partitions 8 can be of any suitable configuration as long as the functional requirements are satisfied.

I claim:

1. A storage and display assembly primarily adapted for receiving cassette and eight-track tapes and comprising an elongate base section having at least one upwardly opening longitudinal groove of female dovetail configuration, and at least one upright partition member having at least one downward projection of male dovetail configuration for sliding engagement within the at least one longitudinal groove, one end of the base section having a transverse male dovetail configuration and the other end of the base section having a female dovetail configuration whereby identical base members may be joined endwise together to any length, and complementary end caps to cover the ends of the base section, the top surface of each upright member having a recess therein, and the bottom surface of each base member having a number of transverse downward projections provided uniformly theralong, the recess being adapted to receive a selected one of the downward projections enabling vertical enlargement of the assembly, the top surface of the base sections having low transverse dividers to separate and support cassettes carried therebetween.

2. An assembly according to claim 1, the base section having an upstanding rear wall, the dividers increasing in height rearwardly to the said wall.

3. An assembly according to claim 1 or 2, at least two hook-members being provided along the rear of each base section enabling the sections to be wall-mounted using wall-mounting channels, or secured within a carrying case.

* * * * *